United States Patent
Kimura et al.

(10) Patent No.: US 10,781,109 B2
(45) Date of Patent: Sep. 22, 2020

(54) IRON OXYHYDROXIDE NANODISPERSION LIQUID

(71) Applicant: NIPPON SODA CO., LTD., Tokyo (JP)

(72) Inventors: Nobuo Kimura, Tokyo (JP); Masato Amaike, Ichihara (JP)

(73) Assignee: NIPPON SODA CO., LTD., Tokyo (JP)

(*) Notice: Subject to any disclaimer, the term of this patent is extended or adjusted under 35 U.S.C. 154(b) by 216 days.

(21) Appl. No.: 15/764,054

(22) PCT Filed: Oct. 6, 2016

(86) PCT No.: PCT/JP2016/004496
§ 371 (c)(1),
(2) Date: Mar. 28, 2018

(87) PCT Pub. No.: WO2017/061116
PCT Pub. Date: Apr. 13, 2017

(65) Prior Publication Data
US 2018/0282177 A1   Oct. 4, 2018

(30) Foreign Application Priority Data
Oct. 9, 2015 (JP) ................. 2015-200775

(51) Int. Cl.
*C01G 49/02* (2006.01)
*H01F 1/44* (2006.01)
(Continued)

(52) U.S. Cl.
CPC ............... *C01G 49/02* (2013.01); *B01J 2/30* (2013.01); *B01J 20/06* (2013.01);
(Continued)

(58) Field of Classification Search
CPC .. C01G 49/02; C01P 2002/60; C01P 2004/51; C01P 2004/61; C01P 2004/62; B01J 35/023; B01J 23/745
See application file for complete search history.

(56) References Cited

U.S. PATENT DOCUMENTS

2002/0136928 A1* 9/2002 Hayashi ............... G11B 5/733
                                                       428/833.1
2009/0028770 A1   1/2009 Mae et al.
(Continued)

FOREIGN PATENT DOCUMENTS

CN   101423256 A   5/2009
CN   103906523 A   7/2014
(Continued)

OTHER PUBLICATIONS

E.A. Deliyanni et al., "Akaganeite-type beta-Fe(OH) nanocrystals: preparation and characterization," 42 Microporous and Mesoporous Materials 49 (2001).*

(Continued)

*Primary Examiner* — Nicholas E Hill
(74) *Attorney, Agent, or Firm* — Oliff PLC (57) ABSTRACT

It is an object of the present invention to provide a nanodispersion liquid of iron oxyhydroxide that is stable and does not contain components derived from auxiliary components. The nanodispersion liquid of iron oxyhydroxide according to the present invention is a nanodispersion liquid in which particles comprising iron oxyhydroxide as a main component and having an average particle diameter d50 of 0.2 μm or less and a d90 of 1 μm or less are dispersed in a solvent. The iron oxyhydroxide is preferably β-iron oxyhydroxide. The nanodispersion liquid of iron oxyhydroxide according to the present invention preferably contains no other components than a substance derived from at least either of an (Continued)

iron compound and a base, a pH adjusting agent, and a solvent.

10 Claims, 3 Drawing Sheets

(51) Int. Cl.
    *B01J 2/30*     (2006.01)
    *B01J 20/06*     (2006.01)
    *B01J 20/28*     (2006.01)
    *B01J 20/30*     (2006.01)
    *B01J 35/00*     (2006.01)
    *B01J 37/00*     (2006.01)
    *C09C 1/24*     (2006.01)
    *B01J 35/02*     (2006.01)
    *B01J 23/745*     (2006.01)

(52) U.S. Cl.
    CPC ..... *B01J 20/28004* (2013.01); *B01J 20/3021* (2013.01); *B01J 35/0013* (2013.01); *B01J 37/0072* (2013.01); *C09C 1/24* (2013.01); *H01F 1/44* (2013.01); *H01F 1/445* (2013.01); *B01J 23/745* (2013.01); *B01J 35/023* (2013.01); *C01P 2002/60* (2013.01); *C01P 2004/51* (2013.01); *C01P 2004/61* (2013.01); *C01P 2004/62* (2013.01); *C01P 2006/12* (2013.01); *C01P 2006/22* (2013.01); *C01P 2006/40* (2013.01)

(56) References Cited

U.S. PATENT DOCUMENTS

| | | | |
|---|---|---|---|
| 2012/0056121 A1* | 3/2012 | Karunaratne | H01F 1/0054 252/62.56 |
| 2016/0104560 A1 | 4/2016 | Ohkoshi et al. | |

FOREIGN PATENT DOCUMENTS

| | | |
|---|---|---|
| CN | 104066503 A | 9/2014 |
| JP | S58-46607 A | 3/1983 |
| JP | S61-168535 A | 7/1986 |
| JP | H09-77503 A | 3/1997 |
| JP | 2004-509753 A | 4/2004 |
| JP | 2006-124239 A | 5/2006 |
| JP | 2006-182604 A | 7/2006 |
| JP | 2011-51836 A | 3/2011 |
| JP | 2011-235222 A | 11/2011 |
| JP | 2012-212807 A | 11/2012 |
| JP | 2013-226548 A | 11/2013 |
| JP | 2014-224027 A | 12/2014 |
| JP | 2015-224166 A | 12/2015 |
| WO | 2002/026633 A1 | 4/2002 |
| WO | 2006/088083 A1 | 8/2006 |
| WO | 2013/034267 A1 | 3/2013 |
| WO | 2013/088185 A1 | 6/2013 |
| WO | 2016/047559 A1 | 3/2016 |

OTHER PUBLICATIONS

D.N. Bakoyannakis et al., "Akaganeite and goethite-type nanocrystals: synthesis and characterization," 59 Microporous and Mesoporous Materials 35 (2003).*

Benjamin Gilbert et al., "Stable cluster formation in aqueous suspensions of iron oxyhydroxide nanoparticles," 313 Journal of Colloid and Interface Science 152 (2007).*

Nov. 1, 2016 Search Report issued in International Patent Application No. PCT/JP2016/004496.

Apr. 10, 2018 International Preliminary Report on Patentability issued in International Patent Application No. PCT/JP2016/004496.

\* cited by examiner

IRON OXYHYDROXIDE NANODISPERSION LIQUID

TECHNICAL FIELD

The present invention relates to a nanodispersion liquid comprising iron oxyhydroxide as a main component.

This application claims priority to Japanese Patent Application No. 2015-200775 filed on Oct. 9, 2015, the contents of which are incorporated herein.

BACKGROUND ART

Iron oxyhydroxide includes an α type, a β type, a γ type, or an amorphous type according to the difference in crystal structure. Iron oxyhydroxide has wide applications such as a pigment, a magnetic material, a catalyst, an adsorbent, or their raw material and is also required to be in a stable dispersion for magnetic material and catalyst applications.

But, it is considered difficult to form a stable nanodispersion liquid with iron oxyhydroxide. For example, in Patent Document 1, an aqueous suspension comprising "iron oxyhydroxide having a particle size of 500 nm or less" is described, but this specifically consists of particles in which a plurality of needle-shaped primary particles of α-iron oxyhydroxide having a width represented by the above particle size aggregate, and a nanodispersion liquid cannot be formed. A production method for preventing such aggregation is also studied, and, for example, in Patent Document 2, it is stated that iron(II) ions are supported on a clay mineral and changed to supported iron oxyhydroxide by hydrolysis and oxidation for use as a photocatalyst.

On the other hand, in Patent Document 3, a production method for a metal hydroxide sol produced in the presence of a compound having buffer action is described, and specifically a β-iron oxyhydroxide sol having an average particle diameter of about 8 nm and comprising a small amount of an aluminum compound is described. In Patent Document 4, an iron oxyhydroxide sol having a median diameter of around 10 nm stabilized with a hydroxycarboxylic acid is described. Also in Patent Document 5, an iron hydroxide sol produced in the presence of citric acid is described. For the production of these sols, auxiliary components other than iron oxyhydroxide and a solvent are required, the steps are also complicated, and the remaining of a hydroxide of a metal other than iron, a carboxylic acid, and the like that are components derived from the auxiliary components is unavoidable. In addition, these are stable when nearly neutral, but are not necessarily stable when acidic.

In Patent Documents 6 and 7, the use of β-iron oxyhydroxide sols as raw materials of magnetic materials is described, but these sols are commercial products and correspond to the sols described in Patent Documents 3 to 5.

In Patent Documents 8, 9, and 10, methods for producing iron oxyhydroxide that can be used as an anion adsorbent are described, but further forming a nanodispersion liquid with the iron oxyhydroxide is unknown.

PRIOR ART DOCUMENTS

Patent Documents

Patent Document 1: Japanese unexamined Patent Application Publication (Translation of PCT Application) No. 2004-509753 (WO2002/026633)
Patent Document 2: Japanese unexamined Patent Application Publication No. 2013-226548
Patent Document 3: Japanese unexamined Patent Application Publication No. 9-77503
Patent Document 4: Japanese unexamined Patent Application Publication No. 2011-51836
Patent Document 5: Japanese unexamined Patent Application Publication No. 2006-182604
Patent Document 6: Japanese unexamined Patent Application Publication No. 2014-224027
Patent Document 7: WO2016/047559
Patent Document 8: Japanese unexamined Patent Application Publication No. 2006-124239
Patent Document 9: WO2006/088083
Patent Document 10: Japanese unexamined Patent Application Publication No. 2011-235222

SUMMARY OF THE INVENTION

Object to be Solved by the Invention

In order to form a stable nanodispersion liquid with iron oxyhydroxide, conventionally, a special production method performed using auxiliary components in a solution of an iron compound that is a raw material has been required. In addition, the obtained dispersion liquid also commonly contains components derived from the auxiliary components, and a dispersion liquid containing these components as little as possible has been required.

Means to Solve the Object

The present inventors have found that a nanodispersion liquid can be easily produced from particular iron oxyhydroxide without using auxiliary components. For this, it has been clarified that properties different from those of the raw material are exhibited for the crystal structure and the like. The present invention has been completed based on the above findings.

Specifically, the present invention relates to the following inventions.

(1) A nanodispersion liquid in which particles comprising iron oxyhydroxide as a main component and having an average particle diameter d50 of 0.2 μm or less and a d90 of 1 μm or less are dispersed in a solvent, the nanodispersion liquid comprising no other components than a substance derived from at least either of an iron compound and a base, and a pH adjusting agent.
(2) The nanodispersion liquid according to (1), wherein an average crystallite diameter of the particles is 5 nm or less.
(3) The nanodispersion liquid according to (1) or (2), wherein the iron oxyhydroxide is β-iron oxyhydroxide.
(4) The nanodispersion liquid according to (3), wherein a shape of a crystal of the β-iron oxyhydroxide is granular.
(5) The nanodispersion liquid according to (3) or (4), wherein a part of hydroxyl groups of the β-iron oxyhydroxide are replaced by chlorine ions, and a content of the chlorine is 0.5% by mass or more.
(6) The nanodispersion liquid according to any one of (1) to (5), having a pH of 2.0 to 5.5.
(7) The nanodispersion liquid according to any one of (1) to (6), wherein the solvent is water.
(8) The nanodispersion liquid according to any one of (1) to (7), having an isoelectric point of pH 6.0 to 8.0.
(9) The nanodispersion liquid according to any one of (1) to (8), wherein a solid content concentration of the dispersion liquid is 5% by mass or more.

(10) The nanodispersion liquid according to any one of (1) to (9), having a viscosity of 20 mPa·s or less.
(11) A method for producing a nanodispersion liquid according to any one of (1) to (10), comprising a step of wet-grinding a solid comprising iron oxyhydroxide as a main component.

Effect of the Invention

By using the iron oxyhydroxide nanodispersion liquid of the present invention, a nanodispersion liquid can be easily produced without using auxiliary components.

MODE OF CARRYING OUT THE INVENTION (Nanodispersion Liquid)

The nanodispersion liquid of the present invention is a nanodispersion liquid in which particles comprising iron oxyhydroxide as a main component and having an average particle diameter d50 of 0.2 μm or less and a d90 of 1 μm or less are dispersed in a solvent.

A nanodispersion liquid refers to a dispersion liquid in which the so-called nanoparticles having a particle diameter of 1 μm or less are dispersed in a liquid phase, and in which the particles do not settle by standing or usual centrifugal operation.

The particle diameter of the nanoparticles contained in the nanodispersion liquid of the present invention is preferably 0.01 to 1 μm. The average particle diameter is preferably 0.02 to 0.2 μm, more preferably 0.05 to 0.15 μm.

Iron oxyhydroxide includes an α type, a β type, a γ type, and an amorphous type according to the difference in crystal structure. Among these, β-iron oxyhydroxide is suitable as a raw material of the nanodispersion liquid of the present invention in terms of easily forming a nanodispersion liquid. β-Iron oxyhydroxide is suitable for an adsorbent and excellent particularly as an anion adsorbent.

In β-iron oxyhydroxide, generally, a part of the hydroxyl groups are replaced by chlorine ions. When β-iron oxyhydroxide comes into contact with water in the process of production or use, these chlorine ions are removed, and small vacancies remain. It is considered that these vacancies are involved in the adsorption of anions of fluorine and the like. The property of easily forming a stable nanodispersion liquid may also be related to these.

The iron oxyhydroxide in the nanodispersion liquid of the present invention is preferably β-iron oxyhydroxide.

Further, the amount of chlorine ions contained in the β-iron oxyhydroxide crystal structure in the present invention is preferably 0.5 wt % or more. The amount of chlorine ions contained in the β-iron oxyhydroxide crystal structure is more preferably 1.5 wt % or more, further preferably 2 wt % or more, and particularly preferably 3 wt % or more. The upper limit of the amount of chlorine ions contained in the β-iron oxyhydroxide crystal structure is not particularly limited but is usually 10 wt % or less.

The nanodispersion liquid of the present invention preferably contains no other components than a substance derived from at least either of an iron compound that is essential as a raw material and a base, a pH adjusting agent, and a solvent. The pH adjusting agent in the present invention means a strong acid or a strong base having no buffer action. Specifically, examples of the acid include hydrochloric acid, sulfuric acid, and nitric acid, and examples of the base include sodium hydroxide and potassium hydroxide. The pH adjusting agent more preferably contains no other components than hydrochloric acid.

The nanodispersion liquid of the present invention preferably does not contain an organic acid or a salt thereof, an inorganic weak acid or a salt thereof, a metal oxide or a metal hydroxide (excluding iron oxide, iron hydroxide, and iron oxyhydroxide), or a dispersing agent.

Conventionally, these components are commonly contained in a dispersion of iron oxyhydroxide as auxiliary components for dispersion stabilization, but in the present invention, these auxiliary components need not be used in the production process.

For the solids (referring to, of dispersoids and solutes, components that are solids at ordinary temperature) in the nanodispersion liquid of the present invention, it is preferred that the content of an iron compound comprising main component β-iron oxyhydroxide is 99% by mass or more, and the content of substances other than an iron compound 1% by mass or less. The content of iron oxyhydroxide is more preferably 99% by mass, most preferably substantially 100% by mass.

The solid content concentration of the nanodispersion liquid is preferably 5% by mass or more.

In the iron oxyhydroxide used in the present invention, the BET specific surface area is preferably 200 $m^2/g$ or more, and the area distribution of pore volume (dV/dR) calculated by the BJH method is preferably 100 to 300 $mm^3/g/nm$.

The liquid phase other than the nanoparticles in the nanodispersion liquid of the present invention can be used without problems as long as it is a uniform liquid phase. For example, water, an organic solvent, a mixture consisting of a plurality of water or organic solvent, or solutions comprising these as main components can be used, but water or an aqueous solution is preferably used. The solution preferably does not contain an organic acid or a salt thereof, an inorganic weak acid or a salt thereof, or a dispersing agent.

The nanodispersion liquid of the present invention is easily produced as an aqueous dispersion liquid, and from the aqueous dispersion liquid, a dispersion liquid in another solvent such as an organic solvent can also be formed by solvent displacement. For example, by performing solvent exchange while mixing a solvent into the aqueous dispersion liquid in an ultrafiltration membrane, a dispersion liquid in the solvent can be obtained. By mixing a solvent having a higher boiling point than water into the aqueous dispersion liquid and removing water by a rotary evaporator or the like, a dispersion liquid in the solvent can be obtained.

The shape of the crystals of the nanodispersion liquid of the present invention is preferably granular. Here, granular means being not a needle shape or a plate shape, and more specifically, the longitudinal length/latitudinal length ratio of the crystal is 3 or less.

The nanodispersion liquid of the present invention preferably has an average crystallite diameter of 5 nm or less, more preferably 3 nm or less, and most preferably 1 to 2 nm.

The nanodispersion liquid of the present invention is characterized in that a primary particle consists of a large number of crystallites. Specifically, the ratio of the average particle diameter to the average crystallite diameter is preferably 5 or more, more preferably in the range of 10 to 100.

The average crystallite diameter D is calculated from the diffraction line around 2 θ=35° characteristic of β-iron oxyhydroxide in X-ray diffraction using the following Scherrer equation:

$$D=K\lambda/\beta \cos \theta$$

wherein β represents the half width of the true diffraction peak obtained by correcting machine width due to the apparatus, K represents the Scherrer constant, and λ represents the wavelength of X rays.

The nanodispersion liquid of the present invention can be obtained by wet-grinding solid β-iron oxyhydroxide as described later. Here, when solid β-iron oxyhydroxide having an average crystallite diameter of about 5 to 6 nm is used as the solid β-iron oxyhydroxide that is a raw material, the average crystallite diameter of the obtained nanoparticles is about 1 to 2 nm. The minimum particle diameter of these nanoparticles is about 10 nm, which is larger than the original average crystallite diameter, and therefore it is considered that a decrease in crystallite diameter occurs as the physical effect of the grinding step, rather than the crystallites being simply broken with a decrease in particle diameter.

The nanodispersion liquid of the present invention has high stability on the acidic side of the isoelectric point. This isoelectric point is preferably pH 5.5 to 8.0, more preferably pH 6.0 to 8.0, and further preferably pH 6.0 to 7.5. The nanodispersion liquid has high stability at pH 1.5 to 4.0, particularly pH 2.0 to 3.5.

The nanodispersion liquid of the present invention is stable when the solid content concentration of the dispersion is 5% by mass or more. The solid content concentration is particularly preferably 5 to 10% by mass.

The nanodispersion liquid of the present invention preferably has a pH of 2.0 to 5.5, more preferably a pH of 2.5 to 5.5, and further preferably a pH of 3.0 to 4.5.

The nanodispersion liquid of the present invention has relatively low viscosity under the above conditions. Specifically, the viscosity is 5 to 20 mPa·s, more preferably 10 to 15 mPa·s. The viscosity can be measured by a B-type viscometer.

The factor of the stability as described above that the nanodispersion liquid of the present invention exhibits is not necessarily clear, but it is presumed that the above-described average crystallite diameter or a structural factor described below is related.

The nanodispersion liquid of the present invention is characterized in that the pH increases significantly when anions are adsorbed in an aqueous solution. This is specifically shown by the following method.

150 mL of a potassium dihydrogen phosphate aqueous solution having a concentration of 400 mg/L in terms of phosphorus whose pH is adjusted at a certain value with hydrochloric acid is prepared. The nanodispersion liquid of the present invention containing 1 g of nanoparticles is added thereinto, and the mixture is stirred at room temperature. After a certain time, the aqueous phase is sampled, and the pH is measured. In this sampling method, the liquid phase can be recovered by ultrafiltration, or centrifugation can be performed if necessary to recover the supernatant, because the nanoparticles in the nanodispersion liquid of the present invention aggregate or precipitate naturally when adsorbing anions.

In the nanodispersion liquid of the present invention, the pH of the aqueous solution after 1 hour increases by 0.5 or more with respect to the higher value of either 3.5 or the pH of the added nanodispersion liquid when the pH of the aqueous solution is adjusted at 3.5 in this method.

In contrast to this, β-iron oxyhydroxide that can be used as a material of the nanodispersion liquid of the present invention hardly brings about a change in the pH of the aqueous solution in a state of not having been subjected to treatment such as grinding, even if anions are adsorbed by the same method.

The cause of these is presumed as follows. In β-iron oxyhydroxide not subjected to treatment such as grinding, the hydroxyl groups are in pores large anions such as phosphate ions cannot easily reach. Such pores are formed particularly by the elimination of the chlorine ions. On the other hand, in the nanodispersion liquid of the present invention, such pore structures are broken, and therefore anions easily reach the vicinity of the hydroxyl groups.

Even β-iron oxyhydroxide not subjected to treatment such as grinding can adsorb phosphate ions though the adsorption rate is slow, because it has large vacancies.

In the nanodispersion liquid of the present invention, following this, the adsorbed anions are exchanged for the hydroxyl groups, and the adsorbent changes into a form in which the anions are directly bonded to the adsorbent, and at the same time the hydroxyl groups are released into water as hydroxyl ions. Therefore, the pH of the aqueous solution increases. But, it is presumed that in β-iron oxyhydroxide not subjected to treatment such as grinding, such replacement does not occur, and therefore an increase in pH also does not occur.

From the above, it is considered that in the nanodispersed adsorbent, anions are not only simply adsorbed but subsequently bonded to the adsorbent and are in a state of not dissociating easily, and therefore a significant adsorption effect in which the adsorption rate and the final amount adsorbed are both very high is exhibited.

The method for producing the adsorbent particle of the present invention is not necessarily limited, but a production method comprising the step of wet-grinding a solid comprising β-iron oxyhydroxide as the main component is particularly preferred.

As the above solid comprising β-iron oxyhydroxide as the main component, a dry gel obtained by a method comprising the step of reacting an iron compound-containing solution with a base to form a precipitate at pH 9 or less is preferred. This production method is described, for example, in Patent Documents 8, 9, and 10.

As the above iron compound, an iron salt, particularly a trivalent iron salt, is preferred. Specific examples can include ferric chloride, ferric sulfate, and ferric nitrate. Among these, particularly ferric chloride is preferred.

The above base is used for neutralizing an acidic iron compound aqueous solution to form a precipitation comprising iron oxyhydroxide. Specific examples can include an inorganic base such as sodium hydroxide, potassium hydroxide, calcium hydroxide, ammonia, sodium carbonate, potassium carbonate, or calcium carbonate. Among these, particularly sodium hydroxide is preferred.

The pH in the formation of a precipitate is more preferably adjusted in the range of pH 3.3 to 6. A pH adjusting agent may be used if necessary in order to adjust this pH. As the pH adjusting agent, a substance having buffer action is excluded because of difficult removal. Specific examples include the base as described above and an inorganic strong acid such as hydrochloric acid, sulfuric acid, or nitric acid.

The precipitate comprising iron oxyhydroxide as the main component obtained by the above method can be recovered by filtration, and when the precipitate is dried, a dry gel forms.

Further, after the above step, the step of drying the precipitate, and the step of bringing the dried material into contact with water followed by drying are preferably carried out.

The above two drying steps are preferably performed at 140° C. or less, more preferably 100 to 140° C. For the drying temperature, at low temperature, time is required, which is not suitable for efficient production. At high temperature, iron oxyhydroxide changes to iron oxide, which is not preferred. The drying can be performed in air, in a vacuum, or in an inert gas.

It is considered that in the step of bringing the dried material into contact with water, impurities such as sodium chloride dissolve and leave pores behind, and the specific surface area increases.

After the dried material is brought into contact with water, the water is removed followed by drying again. This drying step is also preferably performed under the same conditions as the above.

The dry gel obtained by the above method comprises β-iron oxyhydroxide as the main component.

The nanodispersion liquid of the present invention can be used as a pigment, a magnetic material, a catalyst, an adsorbent, or a raw material for producing them. When the nanodispersion liquid of the present invention is dried, it can be molded into various shapes and can also allow an inorganic material to adhere firmly, and therefore it is suitable for a binder application.

EXAMPLE

The present invention will be explained more specifically below referring to Examples, but the present invention is not intended to be limited to the following Examples.
Measurement Methods
(Powder X-Ray Diffraction)

The X-ray diffraction (XRD) pattern was measured using an X-ray diffraction apparatus, Ultima IV (manufactured by Rigaku Corporation). For the measurement, a CuKα tube was used. The average crystallite diameter was calculated from the XRD according to the Scherrer equation.
(Specific Surface Area)

The specific surface area was measured by a gas adsorption method using a specific surface area measuring apparatus, MacsorbHM 1210 (manufactured by Mountech Co., Ltd.).
(TEM Observation and FFT Analysis)

The TEM (transmission electron microscope) observation of a sample was performed using a transmission electron microscope, JEM 2010F (manufactured by JEOL Ltd., acceleration voltage of 200 kV). FFT (fast Fourier transform) analysis according to this was performed using Digital Micrograph manufactured by Gatan, Inc.
(Content of Chlorine Ions in Iron Oxyhydroxide)

An iron oxyhydroxide sample was dissolved in 3 M sulfuric acid, and then the solution was diluted with an alkali solution to precipitate iron. The solution was filtered through a filter, and the filtrate was recovered. Determination of the quantity of chlorine ions was performed by ion chromatography (DX-500 model manufactured by Nippon Dionex K.K.).
(Viscosity of Dispersion Liquid)

Measurement was performed at 20° C. by a tuning fork vibro viscometer, SV-10 (manufactured by A&D Company, Limited).
(Particle Size Distribution of Dispersion Liquid)

Regarding the particle diameter of micron order of a dispersion liquid, the volume-based cumulative 50% particle diameter (D50) and the volume-based cumulative 90% particle diameter (D90) were measured using a laser diffraction/scattering particle size distribution measuring apparatus, LA-920 (manufactured by HORIBA, Ltd.).

The particle diameter, particle size distribution, cumulative 50% particle diameter (D50), and cumulative 90% particle diameter (D90) of a nanodispersion liquid were measured using a dynamic light scattering particle size distribution measuring apparatus, Zetasizer Nano S (manufactured by Spectris Co., Ltd.).
(Zeta Potential of Dispersed Particles)

The zeta potential was measured using Nanotrac (Nanotrac Wave UZ152, manufactured by NIKKISO CO., LTD.).

Reference Example 1 (Production of Iron Oxyhydroxide)

A sodium hydroxide (NaOH) aqueous solution was dropped into a ferric chloride (FeCl$_3$) aqueous solution at room temperature while the pH was adjusted at 6 or less, to cause a reaction with the final amount of NaOH added set at NaOH/FeCl$_3$ (molar ratio)=2.75, thereby obtaining a particle suspension of iron oxyhydroxide. The average particle diameter d50 of the particles in the obtained suspension was 17 μm.

The suspension was filtered, and then the residue was dried in air at 120° C., washed with ion-exchanged water, and further dried in air at 120° C. to obtain a powder of iron oxyhydroxide (powder A).

The particle diameter of the iron oxyhydroxide powder (powder A) obtained by the above was 0.25 mm to 5 mm. It was confirmed by X-ray diffraction that the crystal structure was that of β-iron oxyhydroxide, and the average crystallite diameter was 5 nm.

Figure 1:
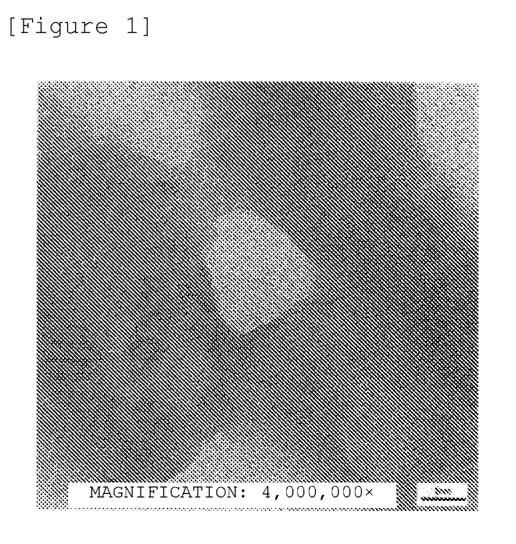
FIG. 1 is a diagram showing a TEM image of iron oxyhydroxide crystals obtained in Reference Example 1.

The state in transmission electron microscope (TEM) observation is shown in FIG. 1. The crystal shape was granular. The crystallite diameter according to TEM observation was 5 to 10 nm, the individual crystals were granular, and these coagulated to form particles.

The specific surface area was 280 m$^2$/g, and the chlorine ion content was 5.8 wt %.

The above iron oxyhydroxide powder was dry-ground to a particle diameter of about 300 μm or less in a pin mill to obtain a powder. The powder was used for the following.

Example 1 (Production of Iron Oxyhydroxide Nanodispersion Liquid)

The above iron oxyhydroxide ground material was mixed into ion-exchanged water to a solid content concentration of 10% by mass and then coarsely ground in a bead mill (zirconia beads, bead diameter of 1 mm) for 30 minutes (dispersion liquid B). The coarsely ground material was further ground in a bead mill (zirconia beads, bead diameter of 0.1 mm) for 60 minutes. By this grinding, the brown suspension liquid (dispersion liquid B) changed to a black and substantially transparent nanodispersion liquid (nanodispersion liquid C).

When the nanodispersion liquid C was thinly spread and dried, a film was obtained. When the nanodispersion liquid C was thickly spread and dried, hard particles similar to the powder A were obtained. The nanodispersion liquid C also had the binder function of adhering firmly when dried on a support, and was molded into various shapes though inorganic material.

Further, even when 1 year elapsed with the nanodispersion liquid C being at room temperature, the nanodispersion liquid C did not gel and was stable though the particles settled slightly, and a dispersion state was easily recovered when the nanodispersion liquid C was stirred.

The pH of the obtained nanodispersion liquid C was 3.1. The viscosity (20° C.) was 10.9 mPa·s.

The specific surface area of the nanodispersed particles was 285 $m^2/g$.

Figure 2:
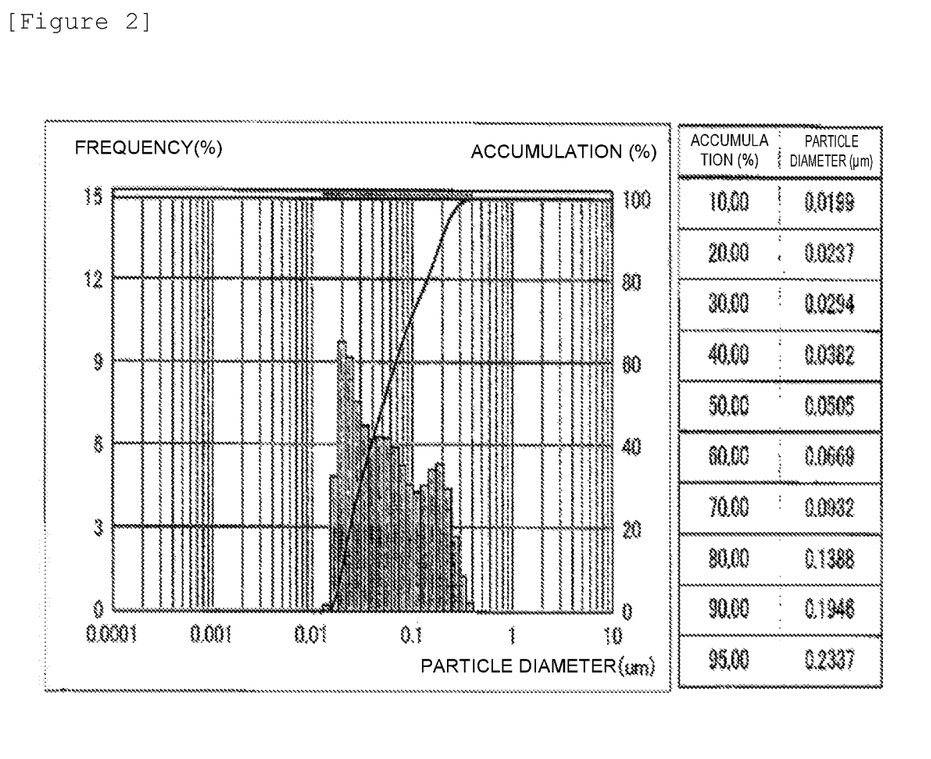
FIG. 2 is a diagram showing the particle size distribution of a nanodispersion liquid obtained in Example 1.

The particle size distribution is shown in FIG. 2. The average particle diameter d50 was 0.05 µm, and the d90 was 0.19 µm.

Figure 3:
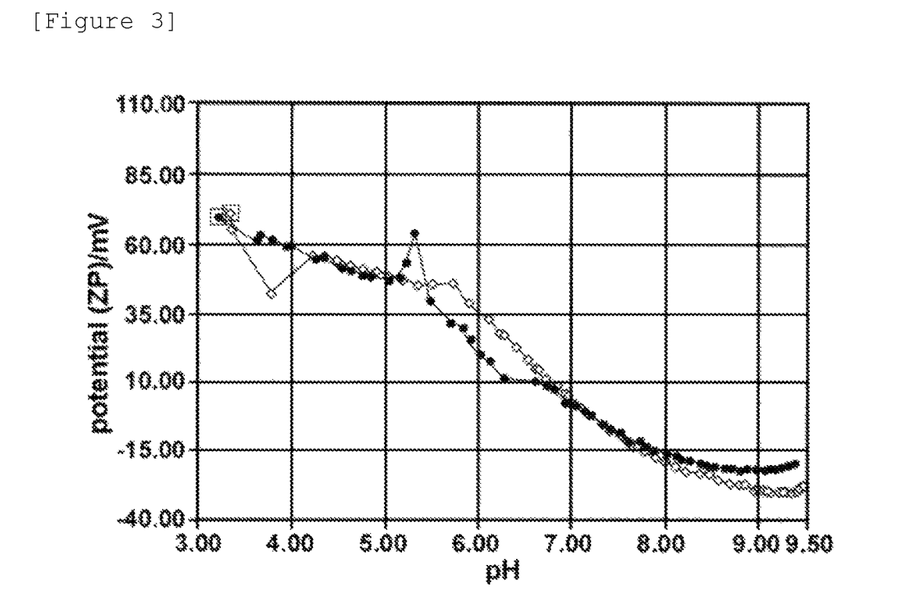
FIG. 3 is a diagram showing the zeta potential of the nanodispersion liquid obtained in Example 1.

The zeta potential measurement results are shown in FIG. 3. The isoelectric point was pH 7.1, and at pH 3.1, the particles were positively charged.

Figure 4:
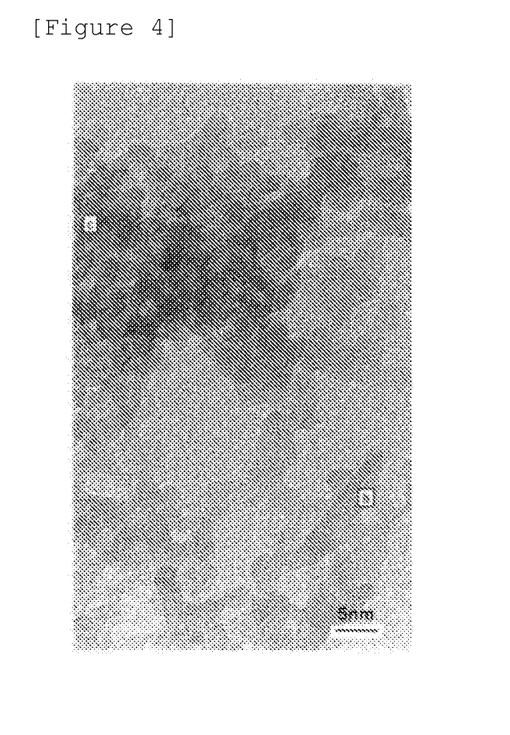
FIG. 4 is a diagram showing a TEM image of nanodispersed particles obtained in Example 1.
Figure 5:
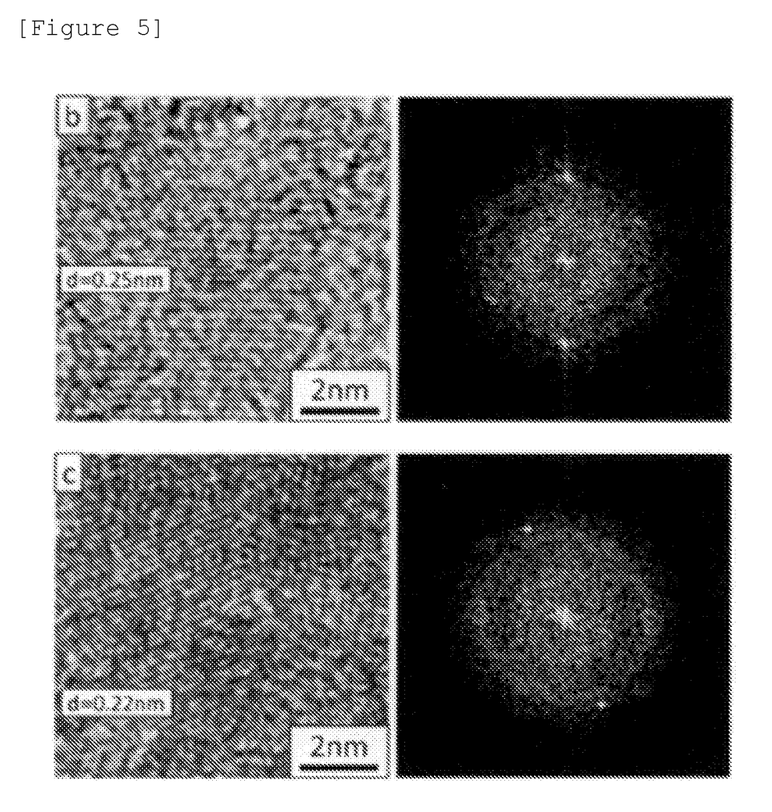
FIG. 5 is a diagram showing the FFT analysis results of the nanodispersed particles obtained in Example 1.

The nanodispersion liquid C was dried at 50° C. This dried material was subjected to X-ray diffraction, TEM observation, and the fast Fourier transform (FFT) analysis of a TEM image. The TEM image is shown in FIG. 4, and the FFT analysis results are shown in FIG. 5. The average particle diameter was about 3 nm, the shape of the crystals according to the TEM observation was granular, and most particles were crystal particles in which crystal stripes were observed. These were identified as β-iron oxyhydroxide crystals from lattice spacing obtained by the FFT analysis.

From the above, it was seen that the obtained nanodispersion liquid had high stability, and the nanodispersed particles contained in the nanodispersion liquid were formed by the coagulation of microcrystals of β-iron oxyhydroxide having high crystallinity.

The invention claimed is:

1. A nanodispersion liquid comprising:
   particles comprising β-iron oxyhydroxide as a main component that are dispersed in a solvent, the particles having an average particle diameter d50 of 0.2 µm or less and a d90 of 1 µm or less
   a substance derived from an iron compound and a base selected from the group consisting of sodium hydroxide, potassium hydroxide, and calcium hydroxide as a raw material, and
   a pH adjusting agent of a strong acid or a strong base having no buffer action,
   wherein the nanodispersion liquid comprises no other components than the particles dispersed in the solvent, the substance, and the pH adjusting agent.

2. The nanodispersion liquid according to claim 1, wherein an average crystallite diameter of the particles is 5 nm or less.

3. The nanodispersion liquid according to claim 1, wherein a shape of a crystal of the β-iron oxyhydroxide is granular.

4. The nanodispersion liquid according to claim 1, wherein a part of hydroxyl groups of the β-iron oxyhydroxide is replaced by chlorine ions, and a content of the chlorine is 0.5% by mass or more.

5. The nanodispersion liquid according to claim 1, having a pH of 2.0 to 5.5.

6. The nanodispersion liquid according to claim 1, wherein the solvent is water.

7. The nanodispersion liquid according to claim 1, having an isoelectric point of pH 6.0 to 8.0.

8. The nanodispersion liquid according to claim 1, wherein a solid content concentration of the dispersion liquid is 5% by mass or more.

9. The nanodispersion liquid according to claim 1, having a viscosity of 20 mPa·s or less.

10. A method for producing-a the nanodispersion liquid according to claim 1, comprising a step of wet-grinding a solid comprising iron β-iron oxyhydroxide as a main component.

* * * * *

UNITED STATES PATENT AND TRADEMARK OFFICE
CERTIFICATE OF CORRECTION

PATENT NO. : 10,781,109 B2
APPLICATION NO. : 15/764054
DATED : September 22, 2020
INVENTOR(S) : Nobuo Kimura et al.

Page 1 of 1

It is certified that error appears in the above-identified patent and that said Letters Patent is hereby corrected as shown below:

In the Claims

Claim 10, Column 10, Line 36:
"10. A method for producing a the nanodispersion liquid"

Should be changed to:
--10. A method for producing the nanodispersion liquid--

Claim 10, Column 10, Lines 38–39:
"solid comprising iron β-iron oxyhydroxide as a main component."

Should be changed to:
--solid comprising β-iron oxyhydroxide as a main component.--

Signed and Sealed this
Twenty-second Day of December, 2020

Andrei Iancu
*Director of the United States Patent and Trademark Office*